(12) United States Patent
Song et al.

(10) Patent No.: US 11,934,503 B2
(45) Date of Patent: Mar. 19, 2024

(54) ELECTRONIC APPARATUS AND CONTROL METHOD THEREOF

(71) Applicant: SAMSUNG ELECTRONICS CO., LTD., Suwon-si (KR)

(72) Inventors: Jiyoung Song, Suwon-si (KR); Taeho Kgil, Suwon-si (KR); Geunhwi Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 56 days.

(21) Appl. No.: 17/704,975

(22) Filed: Mar. 25, 2022

(65) Prior Publication Data
US 2022/0215685 A1 Jul. 7, 2022

Related U.S. Application Data

(63) Continuation of application No. PCT/KR2020/007751, filed on Jun. 16, 2020.

(30) Foreign Application Priority Data
Sep. 26, 2019 (KR) .................. 10-2019-0118677

(51) Int. Cl.
G06F 21/32 (2013.01)
G06V 40/12 (2022.01)

(52) U.S. Cl.
CPC .......... *G06F 21/32* (2013.01); *G06V 40/1365* (2022.01)

(58) Field of Classification Search
CPC ............ G06F 21/32; G06F 2203/0338; G06F 3/0484; G06F 3/04883; G06F 21/36; G06F 3/0488; G06V 40/1365; G06V 40/12
See application file for complete search history.

(56) References Cited

U.S. PATENT DOCUMENTS

| | | | |
|---|---|---|---|
| 9,020,567 | B2 | 4/2015 | Fyke |
| 9,953,152 | B2 | 4/2018 | Fadell et al. |
| 11,036,954 | B2 | 6/2021 | Lee et al. |
| 2012/0170819 | A1 | 7/2012 | Kiyomoto et al. |

(Continued)

FOREIGN PATENT DOCUMENTS

| | | |
|---|---|---|
| JP | 2012141861 A | 7/2012 |
| JP | 201316115 A | 1/2013 |

(Continued)

OTHER PUBLICATIONS

International Search Report (PCT/ISA/210) and Written Opinion (PCT/ISA/237) dated Sep. 15, 2020 issued by the International Searching Authority in International Application No. PCT/KR2020/007751.

(Continued)

*Primary Examiner* — Premal R Patel
(74) *Attorney, Agent, or Firm* — Sughrue Mion, PLLC

(57) ABSTRACT

An electronic apparatus is provided. The electronic apparatus includes a display; a sensor configured to detect a fingerprint of a user on the display; and a processor configured to: identify the fingerprint of the user based on information from the sensor; and control the display to display a path configured to guide a user touch on the display to move to a boundary of the display from a first region where the fingerprint has been detected.

15 Claims, 11 Drawing Sheets

(56) References Cited

U.S. PATENT DOCUMENTS

| | | | |
|---|---|---|---|
| 2012/0212418 A1* | 8/2012 | Shiota | G06F 3/0486 345/173 |
| 2016/0364600 A1 | 12/2016 | Shah et al. | |
| 2017/0169199 A1 | 6/2017 | Clarke et al. | |
| 2020/0092411 A1* | 3/2020 | Xu | H04W 4/14 |
| 2020/0234031 A1* | 7/2020 | De Foras | G06V 40/1388 |

FOREIGN PATENT DOCUMENTS

| | | |
|---|---|---|
| KR | 1020100026219 A | 3/2010 |
| KR | 1020110103598 A | 9/2011 |
| KR | 101545487 B1 | 8/2015 |
| KR | 1020150137836 A | 12/2015 |
| KR | 1020160049864 A | 5/2016 |
| KR | 1020180093294 A | 8/2018 |
| KR | 1020190093003 A | 8/2019 |
| KR | 1020190102705 A | 9/2019 |
| KR | 102020638 B1 | 11/2019 |

OTHER PUBLICATIONS

Ga-Yong, M., et al., "Aluminum Foil Unlock All Phones having In-Display Fingerprint Reader", Weekly Security Premium Report, Dec. 30, 2021, 6 pages, https://www.boannews.com/media/view.asp?idx=74751.

\* cited by examiner

ELECTRONIC APPARATUS AND CONTROL METHOD THEREOF

CROSS REFERENCE TO RELATED APPLICATIONS

This application is a by-pass continuation of International Application No. PCT/KR2020/007751, filed on Jun. 16, 2020 in the Korean Intellectual Property Receiving Office, which is based on and claims priority to Korean Application No. 10-2019-0118677, filed on Sep. 26, 2019 in the Korean Intellectual Property Office, the entire disclosures of which are incorporated herein by reference.

BACKGROUND

1. Field

The disclosure relates to an electronic apparatus and a control method thereof, and more particularly, to an electronic apparatus for displaying a path that guides touch and drag of the user on a display, and a control method thereof.

2. Description of Related Art

With the development of electronic technology, the use of an electronic apparatus including a display having a touch panel has become common. Such an electronic apparatus may receive a user input by touching the display using a hand or a stylus pen. As such, the input method of touching the display provides an intuitive user interface on the display instead of a keyboard, mouse, or physical button, and the user receives a user command by touching a specific position on a screen through the user interface displayed on the display.

In this regard, a technique for authenticating a user through user touch input has become increasingly common in recent years. When the user's finger touches the display, the electronic apparatus recognizes a fingerprint of a user and authenticates the user based on the recognized fingerprint of the user, thereby performing a function of the electronic apparatus or an application executed in the electronic apparatus. The user authentication method using a fingerprint is spreading rapidly in that it is simpler and more convenient than the conventional password input method.

There is a problem that the fingerprint of the user may be left on the display due to oil contained in human skin and that a fingerprint on the display may be acquired by a third party using a chemical method. In this case, since the third party who has acquired a fingerprint of the user can unlock the electronic apparatus or application by using the fingerprint of the user, the electronic apparatus that receives the user touch as an input poses a security risk.

SUMMARY

Provided are an electronic apparatus for displaying a path that guides touch and drag of the user in order to remove the fingerprint of the user left on a display, and a method for controlling thereof.

Additional aspects will be set forth in part in the description which follows and, in part, will be apparent from the description, or may be learned by practice of the presented embodiments.

According to an aspect of the disclosure, there is provided an electronic apparatus including: a display; a sensor configured to detect a fingerprint of a user on the display; and a processor configured to: identify the fingerprint of the user based on information from the sensor; and control the display to display a path configured to guide a user touch on the display to move to a boundary of the display from a first region where the fingerprint has been detected.

The processor may be further configured to complete a user authentication based on the identified fingerprint of the user being a pre-registered fingerprint and a movement of the user touch being completed along the path.

The processor may be further configured to control the display to display a lock screen, and control the sensor to detect the fingerprint based on the user touch being detected on the lock screen.

The processor may be further configured to, based on the user authentication being required, control the display to display a user interface (UI) element configured to request a touch of a finger on the display, and control the display to display the path based on the touch of the finger being detected after the UI element is displayed.

The processor may be further configured to identify a security strength of an application requesting the user authentication, determine a number of inflection points included in the path or a length of the path corresponding to the security strength, and generate the path based on the number of the inflection points or the length of the path.

The processor may be further configured to determine a holding shape of the user based on the identified fingerprint of the user, determine a second region where the path is to be displayed based on the holding shape of the user, and generate the path in the second region.

The processor may be further configured to generate the path in a partial region of the display based on the holding shape of the user.

The path is a straight path from the first region where the fingerprint has been detected to the boundary of the display.

The processor may be further configured to determine a plurality of points on the display and an endpoint positioned at the boundary of the display, and generate the path that passes through the plurality of points and leads to the endpoint in the first region where the fingerprint has been detected.

According to an aspect of the disclosure, there is provided a method for controlling an electronic apparatus, the method including: detecting a fingerprint of a user on a display; identifying the fingerprint of the user; and displaying a path configured to guide a user touch on the display to move to a boundary of the display from a first region where the fingerprint has been detected.

The method may further include authenticating the user based on the identified fingerprint of the user being a pre-registered fingerprint and a movement of the user touch being completed along the path.

The method may further include displaying a lock screen, wherein the detecting the fingerprint of the user includes detecting the fingerprint based on the user touch being detected on the lock screen.

The method may further include: based on a user authentication being required, displaying a user interface (UI) element configured to request a touch of a finger on the display; and displaying the path based on the touch of the finger being detected after the UI element is displayed.

The method may further include: identifying a security strength of an application requesting user authentication; determining a number of inflection points included in the path or a length of the path corresponding to the security strength; and generating the path based on the number of the inflection points or the length of the path.

The method may further include determining a holding shape of the user based on the identified fingerprint of the user; determining a second region where the path is to be displayed based on the holding shape of the user; and generating the path in the second region.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
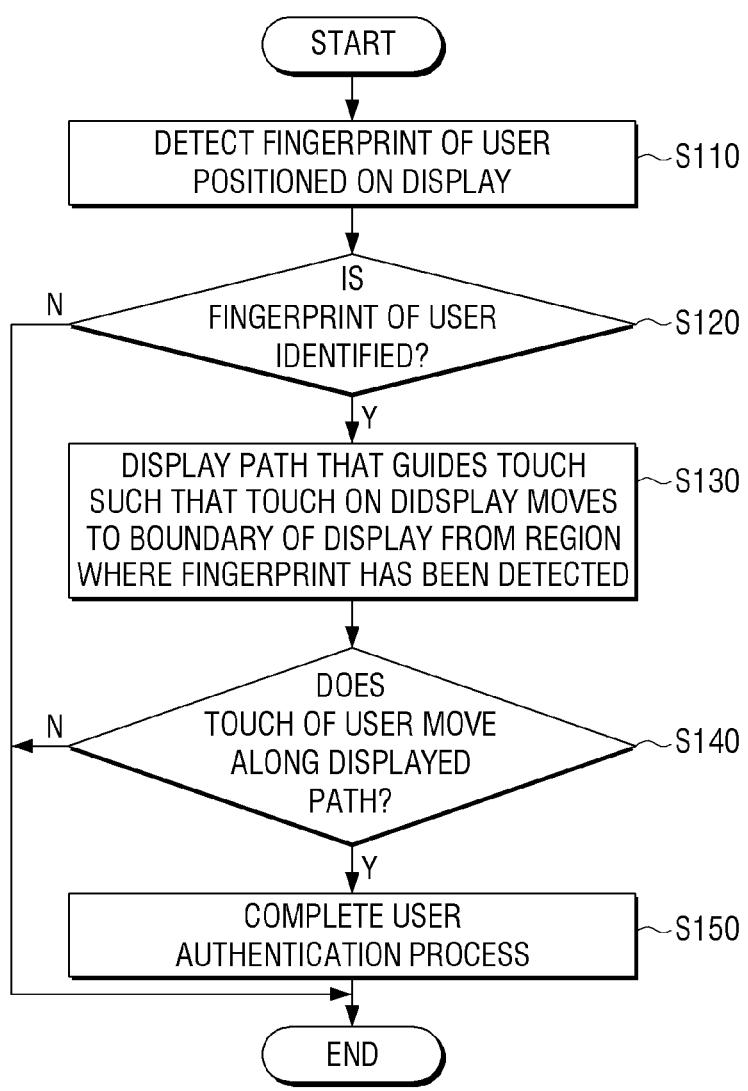
FIG. 1 is a flowchart illustrating a method of controlling an electronic apparatus according to an embodiment.

Hereinafter, various embodiments of the disclosure will be described with reference to the accompanying drawings. However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar elements.

In the disclosure, the terms "include", "may include", "comprise" or "may comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the description, the term "A or B", "at least one of A or B", "at least one of A and B", or "one or more of A or/and B" may include all possible combinations of the items that are enumerated together. For example, the term "A or B" or "at least one of A or/and B" may designate (1) only A, (2) only B, or (3) both A and B.

The expression "1", "2", "first", or "second" as used herein may modify a variety of elements, irrespective of order and/or importance thereof, and to distinguish one element from another, without limiting the corresponding elements.

If it is described that a certain element (e.g., first element) is "operatively or communicatively coupled with/to" or is "connected to" another element (e.g., second element), it should be understood that the certain element may be connected to the other element directly or through still another element (e.g., third element). When it is mentioned that one element (e.g., first element) is "directly coupled" with or "directly connected to" another element (e.g., second element), it may be understood that there is no element (e.g., third element) present between one element and another element.

In the description, the term "configured to" may be used interchangeably with, for example, "suitable for", "having the capacity to", "designed to", "adapted to", "made to", or "capable of" under certain circumstances. The term "configured to (set to)" does not necessarily refer to "specifically designed to" in a hardware level. Under certain circumstances, the term "device configured to" may refer to "device capable of" doing something together with another device or components. For example, a phrase "a sub-processor configured to (set to) perform A, B, and C" may refer to a generic-purpose processor (e.g., central processing unit (CPU) or application processor) capable of performing corresponding operations by executing a dedicated processor (e.g., embedded processor) for performing corresponding operation, or executing one or more software programs stored in a memory device.

In the disclosure, the term "user" may refer to a person using an electronic apparatus or a device (e.g., an artificial intelligence electronic apparatus) using an electronic apparatus.

In embodiments of the disclosure, the electronic apparatus may be a display device such as a smartphone, a mobile phone, a tablet personal computer (PC), a notebook computer, a television (TV), or a kiosk. However, embodiments of the disclosure are not limited thereto, and any electronic apparatus such as a refrigerator, a washing machine, a vacuum cleaner, or a dryer may be an electronic apparatus of the disclosure as long as it includes a display. In addition, a wearable device such as a smart watch may also be an electronic apparatus of the disclosure.

Hereinafter, the disclosure will be described in detail with reference to the accompanying drawings.

FIG. 1 is a flowchart illustrating a method of controlling an electronic apparatus according to an embodiment.

In operation S110, the control method of the electronic apparatus according to an embodiment of the disclosure detects a fingerprint of the user positioned on a display. The fingerprint of the user is a fingerprint for at least one finger of the user using the display, and may include a partial fingerprint of the finger as well as a full fingerprint of the finger.

In this case, a lock screen may be displayed on the display, and a fingerprint may be detected when user touch is detected on the lock screen. Alternatively, a screen of a specific application may be displayed on the display, and a fingerprint may be detected when user touch is detected on the screen of the application.

The fingerprint of the user may be positioned in a region where a user interface (UI) element that guides user touch is displayed on a display screen. A UT element guiding user touch may be displayed to perform a function of an electronic apparatus or a specific application executed in the electronic apparatus, and as the user performs touch input based on the UI displayed on the display, the fingerprint of the user may be positioned in a region where the UT displayed on the display is displayed. For example, if user authentication is required, a UI element requesting touch of the user's finger may be displayed on the display, and as the user performs touch input on the display, the fingerprint of the user may be positioned in a region where the UI element is displayed.

However, this is only an example, and fingerprint of the users positioned in all regions on the display may be detected in addition to a specific region such as a region where the UI for guiding the user touch is displayed. In other words, the fingerprint of the user positioned in a region other than the region where the UI is displayed may be detected.

In operation S120, the control method of the electronic apparatus according to an embodiment of the disclosure may identify the fingerprint of the user. It may be identified whether the detected fingerprint of the user matches the fingerprint of the user previously registered in the electronic apparatus. For this operation, a pre-registered fingerprint of a user may be stored in the electronic apparatus.

If it is identified that the fingerprint of the user matches the pre-registered fingerprint of the user (i.e., operation S120-Y), in operation S130, the control method displays a path that guides a user touch such that the user touch on the display moves to the boundary of the display from the region where the fingerprint has been detected.

When the user touch is detected after the UI element requesting the user touch is displayed, a path from the region where the fingerprint of the user has been detected by the user touch to the boundary of the display may be displayed. Here, the boundary of the display indicates an edge of the display.

For this operation, a plurality of points on the display and an endpoint positioned at a boundary of the display may be determined. In this case, the plurality of points indicate points included on the path displayed on the display, and the endpoint indicates a point positioned at the end of the path. In other words, a path through the plurality of points determined in the region where the fingerprint of the user is detected and leading to the endpoint may be generated.

A method of controlling an electronic apparatus according to various embodiments of the disclosure may generate a path in an entire region or a partial region of a display.

A holding shape of the user may be determined based on the identified fingerprint of the user, a region where a path is to be displayed may be determined based on the determined the holding shape of the user, and a path in the determined region may be generated.

The holding shape of the user indicates a shape in which the user performs touch by holding or gripping the electronic apparatus, and may include whether the user performs touch with a hand holding (or gripping) the electronic apparatus and whether touch is performed on the display with a hand that does not hold the electronic apparatus.

When an angle between one of a plurality of boundaries forming an outer shape of the electronic apparatus and the fingerprint of the user is horizontal or less than a predetermined range, it is identified that touch may be performed on the display with the other hand that does not hold the electronic apparatus. Here, a reference boundary indicates a boundary perpendicular to the ground in a state that a display surface of the electronic apparatus is placed to face the user.

When the angle between one of the plurality of boundaries forming the outer shape of the electronic apparatus and the fingerprint of the user is greater than or equal to the predetermined range, it may be identified that touch is performed on the display with the hand holding the electronic apparatus.

When it is identified that the user holds the electronic apparatus with one hand and touches the display with the other hand that does not hold the electronic apparatus, a path to be displayed on the entire region of the display may be generated.

When it is identified that the user touches the display with the hand holding the electronic apparatus, a partial region of the display may be set based on the fingerprint of the user generated according to the user touch and a path to be displayed in the set region may be generated. This will be described in detail with reference to FIGS. 3A, 3B, 3C, 4A, 4B and 4C.

The method of controlling an electronic apparatus according to an embodiment of the disclosure may include executing an application requesting user authentication. In this case, a security strength of the application that requested user authentication may be identified, the number of inflection points or a path length included in the path may be determined, depending on the identified security strength, and a path may be generated based on the determined number of inflection points or path length. For example, in case of an application having high security strength, the number of inflection points or the path length may be determined to be equal to or greater than a predetermined value, and a path may be generated based on the determined number of inflection points or path length. This will be described in detail with reference to FIGS. 5A and 5B.

In operation S140, when the path is generated and displayed on the display, it may be identified whether the user touch moves along the displayed path. It may be identified whether the user touch is dragged from the region where the fingerprint has been detected to the endpoint of the path through the plurality of points included in the path. It may be identified whether the user touch has continuously moved from the region where the fingerprint has been detected to the endpoint of the path.

In operation S150, when it is identified that the user touch has moved along the path, a user authentication processing may be completed. For example, when the user touch is detected and a path is displayed while the lock screen is displayed and it is identified hat the user touch has moved along the path, user authentication may be completed and the lock screen may be unlocked. Alternatively, when it is identified that user authentication is required to perform a specific function of an application while the application is running and thus a UI element requesting the user touch is displayed and the user touch has moved along the path, the specific function of the application is completed, and thus a specific function may be performed.

As such, when the fingerprint of the user is detected due to the user touch of the electronic apparatus, the user touch and drag may be completed from the region where the fingerprint of the user is detected to the endpoint positioned at the boundary of the display such that the fingerprint of the user may not left on the display.

Figure 2:
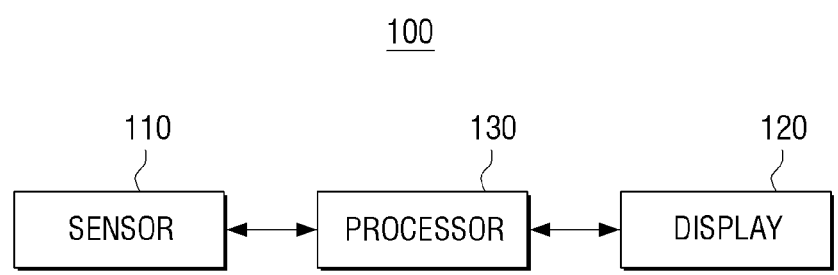
FIG. 2 is a diagram illustrating a configuration of an electronic apparatus according to an embodiment.

FIG. 2 is a diagram illustrating a configuration of an electronic apparatus according to an embodiment.

As shown in FIG. 2, the electronic apparatus 100 may include a sensor 110, a display 120, and a processor 130.

The sensor 110 may include a touch sensor for detecting user touch and a fingerprint sensor for detecting a fingerprint of the user. A touch sensor and a fingerprint sensor may be positioned on a touch panel included in the display.

The touch sensor may detect the user touch on the display. A touch sensor may detect a touch input by measuring a change in a signal (e.g., voltage, light amount, resistance, or electric amount) for a specific position of the display, and provide information about the detected touch input (e.g., location, area, pressure, or time) may be provided to processor 130.

A fingerprint sensor may acquire fingerprint-related data through user touch input. The fingerprint sensor may detect a characteristic pattern of valleys and ridges in the fingerprint of the user, and provide information about the detected pattern of the fingerprint to the processor 130. According to various embodiments of the disclosure, the fingerprint sensor may be operated according to an optical method based on a difference in light reflected by a valley and a ridge in the fingerprint, an ultrasonic method based on a phase difference of ultrasonic waves reflected by valleys and ridges in the fingerprint, or an electrostatic method based on a difference in permittivity caused by valleys and ridges in the fingerprint. The fingerprint sensor may detect a fingerprint of the user positioned on the display.

The display 120 is an element that displays various information under the control of the processor 130. Particularly, the display 120 may display a screen of an application executed in the electronic apparatus, and may display a UI element requesting user touch for fingerprint authentication of the user when the application requires user authentication. Also, the display 120 may display a path from the region where the user touch is detected to an arbitrary point placed on the boundary of the display.

The display 120 of the disclosure may a liquid crystal display (LCD), and in some cases, a cathode-ray tube (CRT), plasma display panel (PDP), organic light emitting diodes (OLED), transparent OLED (TOLED), or the like.

The processor 130 may control overall operations and functions of the electronic apparatus 100. For example, the processor 130 may, for example, control a number of hardware or software elements connected to the processor 130 by driving an operating system or application program, and perform various data processing and calculations. Further, the processor 130 may load and process a command or data received from at least one of the other components to a volatile memory and store diverse data in a non-volatile memory.

For this operation, the processor 130 may be a dedicated processor for performing functions (e.g., an embedded processor) or a generic-purpose processor for performing functions by running one or more software programs stored in a memory device (e.g., a CPU or an application processor).

The processor 130 may control the display 120 to display various screens and display a UI element requesting touch of the finger on the display if user authentication is required.

For example, the processor 130 may control the display 120 to display a lock screen, and when it is identified that a user authentication for unlocking the lock is required, the display 120 may control the display 120 to display a UI element requesting touch of the user's finger. In addition, the processor 130 may control the display 120 to display a screen of an application executed on the electronic apparatus 100, and control the display 120 to display the UI element that requests touch of the user's finger when it is identified that user authentication is required for a specific function of the application.

When user touch is detected after the UI element requesting the touch of the user's finger is displayed, the processor 130 may control the sensor 110 to detect the fingerprint of the user. When the processor 130 detects the user touch using the touch sensor, the processor 130 may control a detection sensor to detect the fingerprint of the user positioned on the display. For example, when the user touch is detected on the lock screen, the processor 130 may control the detection sensor to detect the fingerprint of the user.

The processor 130 may identify the fingerprint of the user. The processor 130 may identify whether the fingerprint of the user positioned on the display is a pre-registered fingerprint by using fingerprint information acquired from the detection sensor. For this operation, the processor 130 may pre-store the fingerprint of the user in a memory.

When the fingerprint of the user matches the pre-registered fingerprint, the processor 130 may control the display 120 to display a path on the display 120 to display a path that guides the user touch on the display 120 to move to the boundary of the display 120 from the region where the fingerprint of the user has been detected. In other words, when the fingerprint of the user matches the pre-registered fingerprint, the processor 130 may display the path from the region where the fingerprint of the user has been detected to the boundary of the display 120.

The processor 130 may determine a plurality of points on the display and an endpoint positioned at the boundary of the display, and generate a path that passes through the plurality of points determined in the region where the fingerprint has been detected and leads to the endpoint positioned at the boundary of the display. In this case, the path may be a straight path from the region where the fingerprint has been detected to the boundary of the display, or may be a curved path including at least one inflection point from the region where the fingerprint has been detected to the boundary of the display.

The processor 130 may determine the holding shape of the user based on the user's holding fingerprint positioned on the display, and display a path from the region where the fingerprint of the user has been detected to the boundary of the display 120 based on the determined holding shape of the user. This will be described in detail with reference to FIGS. 3A, 3B, 3C, 4A, 4B and 4C.

The processor 130 may identify a security strength of an application executed in the electronic apparatus 100, and display a path from the region where the fingerprint of the user has been detected to the boundary of the display 120 based on the identified security strength. This will be described in detail with reference to FIGS. 5A and 5B.

The processor 130 may complete a user authentication processing when the user touch moves along the path displayed on the display 120. When the user touch is made continuously from the region where the fingerprint has been detected to the end point positioned at the boundary of the display through the plurality of points determined by the processor 130, that is, when the user touch is dragged from the region where the fingerprint has been detected, through the plurality of points, and is dragged to the end point positioned at the boundary of the display, the processor 130 may identify that the user touch has been moved along the path. In this case, the processor 130 may identify a region where the user touch is made by using a touch sensor, and compares the region where the user touch is acquired from the touch sensor with the region of the path displayed on the display to identify whether the user touch is dragged along the path, and when it is identified that the user touch is dragged along the path, the user authentication processing may be completed.

In this case, the processor 130 may display a lock screen on the display and unlock the display. In addition, the processor 130 may perform a function of an application requiring user authentication. However, in other embodiments, the processor 130 may perform various other functions according to the completion of user authentication.

However, this is only an example, and even after the user touch and drag is completed, the processor 130 may identify whether a region where the fingerprint of the user is detected exists using a fingerprint sensor. When there is a region where the fingerprint of the user is left, the processor 130 may redirect a path including the region where the fingerprint of the user is displayed and an endpoint positioned at the boundary of the display, and display the redirected path on the display screen.

As such, before the user authentication processing is completed using the fingerprint of the user, the fingerprint of the users may be removed by displaying the path from the region displayed with the fingerprint of the user to the boundary region of the display, and guiding the user to drag the touch along the path. Accordingly, a possibility of exposing the fingerprint of the user to a third party may be reduced.

Figure 3A:
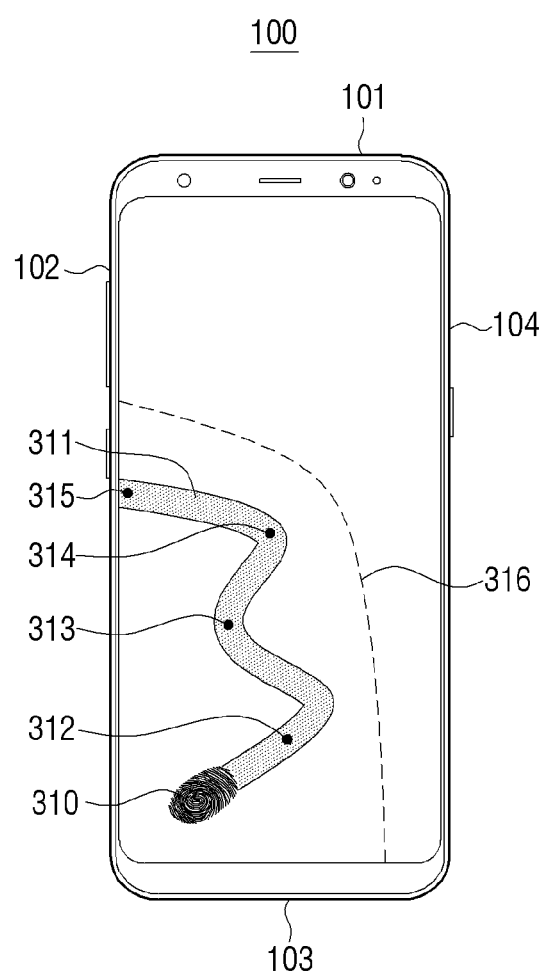
FIGS. 3A, 3B and 3C are diagrams illustrating an electronic apparatus for displaying a path based on a shape in which a user holds a display according to an embodiment.
Figure 3B:
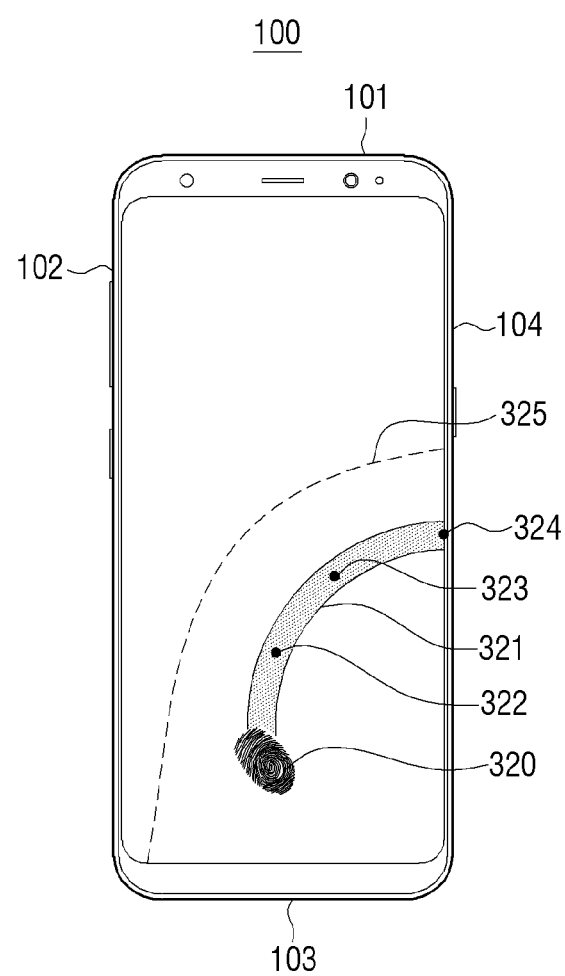
Figure 3C:
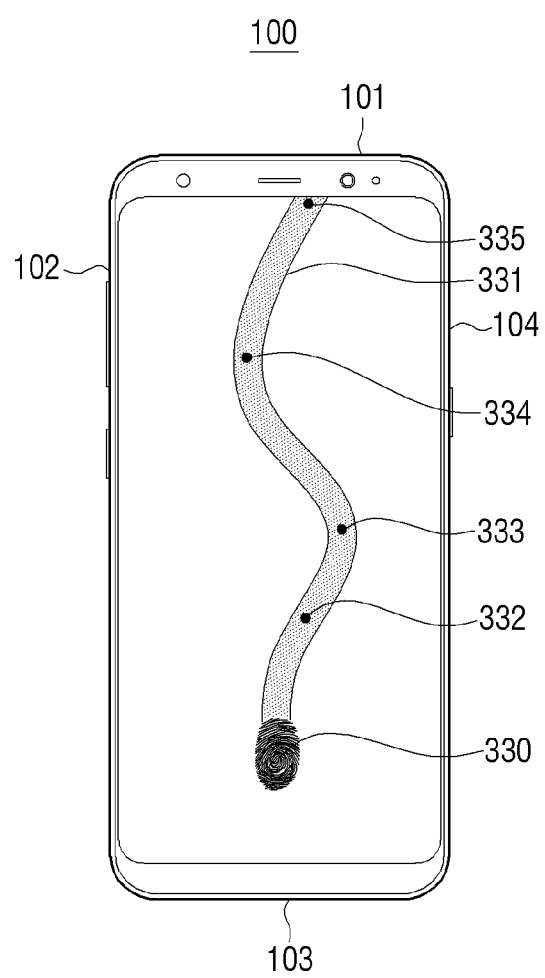

FIGS. 3A, 3B, and 3C are diagrams illustrating an electronic apparatus for displaying a path based on a shape in which a user holds a display, according to an embodiment.

The processor 130 may determine the holding shape of the user based on the identified fingerprint of the user. Here, the holding shape of the user indicates a shape in which the user performs touch by holding or griping the electronic apparatus, and may include whether the user performs touch with a hand holding the electronic apparatus and whether touch is performed on the display with a hand that does not hold the electronic apparatus.

The processor 130 may identify an angle between the fingerprint of the user and one of a plurality of boundaries forming an outer shape of the electronic apparatus 100, and determine the holding shape of the user based on the identified angle. Here, the reference boundary may refer to a boundary perpendicular to the ground in a state that the user holds the surface of the display 120 of the electronic apparatus 100 to face the user, among a plurality of boundaries included in the electronic apparatus 100. As shown in FIGS. 3A, 3B and 3C, when the electronic apparatus 100 includes a plurality of boundaries 101, 102, 103, and 104, and when a user holding the electronic apparatus 100 holds the electronic apparatus 100 such that the screen of the display 120 faces the user, boundaries perpendicular to the ground may be the boundaries 102 and 104.

The processor 130 may determine a region where a path is to be displayed based on the determined holding shape of the user, and may generate a path in the determined region. For example, the processor 130 may generate a path in a partial region of the entire region of the display based on the determined holding shape of the user. This will be described in detail with reference to FIGS. 3A and 3B.

As shown in FIGS. 3A and 3B, when an acute angle between the fingerprint of the user and the boundaries 102 and 104 is greater than or equal to a predetermined range, the processor 130 may identify that the user performed the touch with a hand holding the electronic apparatus.

In this case, the processor 130 may generate a path in a predetermined range in the region where the fingerprint of the user is detected, and display the generated path.

For example, referring to FIG. 3A, the processor 130 may identify that the angle between the fingerprint of the user and the reference boundary 102 is greater than or equal to a predetermined value, and the fingerprint of the user is directed toward an upper right of the display 120, and identify, based on the acquired result, the user has performed touch with the left hand while holding the apparatus with the left hand.

Based on the identified result, the processor 130 may generate a path in a predetermined range in a region where the fingerprint of the user is detected. The processor 130 may generate a path in a left region 316 of the display and display the generated path based on a result of identifying that the user performs touch while holding the electronic apparatus 100 with the left hand. In this case, the processor 130 may include a region 310 in which the fingerprint of the user is detected, at least one point 312, 313, 314 present in the left region 316, and an endpoint 315 present in the boundary 102, and generate a path existing in the left region 316 of the display 120.

Referring to FIG. 3B, the processor 130 may identify that the angle between the fingerprint of the user and the reference boundary 104 is greater than or equal to a predetermined value, and the fingerprint of the user is directed toward an upper left of the display 120, and identify, based on the acquired result, the user has performed touch with the right hand while holding the apparatus with the right hand.

Based on the identified result, the processor 130 may generate a path in a predetermined range in a region where the fingerprint of the user is detected. The processor 130 may generate a path in a right region 324 of the display and display the generated path based on a result of identifying that the user performs touch while holding the electronic apparatus 100 with the right hand. In this case, the processor 130 may include a region 320 in which the fingerprint of the user is detected, at least one point 322 and 323 present in the right region 324, and an endpoint 324 present in the boundary 104, and generate a path existing in the right region 324 of the display 120.

Referring to FIG. 3C, the processor 130 may display a path on the entire region of the display 120. When it is identified that the fingerprint of the user is parallel to the reference boundaries 102 and 104 or the angle between the fingerprint of the user and the boundary corner 104 is less than a predetermined value, the processor may identify that the user performed touch with a hand other than the hand holding the display device.

In this case, the processor 130 may generate a path in the entire region of the display 120 based on the identified result. The processor 130 may control the display to select at least one point 332, 333, 334 in the entire region of the display, select an endpoint 335 positioned at the boundary of the display, and generate a path including the selected at least one point 332, 333, 334 and the endpoint 335 and display it on the display 120.

Only the case in which the user holds the electronic apparatus 100 vertically is illustrated in FIGS. 3A, 3B and 3C, but the disclosure is not limited thereto. In other words, even when the user holds the electronic apparatus 100 horizontally, the processor 130 may determine a holding shape of the user based on the fingerprint of the user, determine a region where a path is to be displayed based on the determined holding shape of the user, and display the path in the determined region.

Figure 4A:
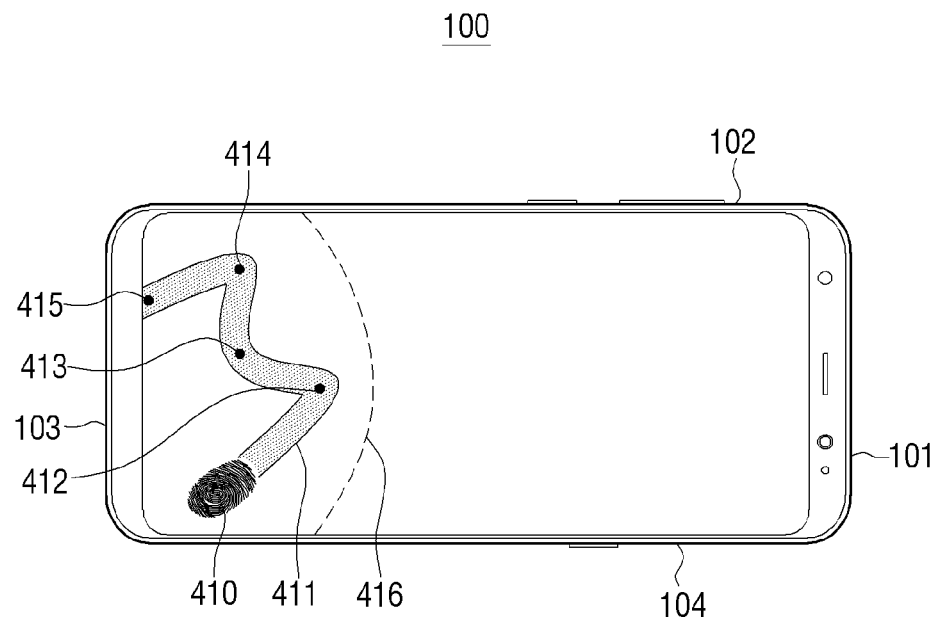
FIGS. 4A, 4B and 4C are diagrams illustrating an electronic apparatus for displaying a path based on a shape in which a user holds a display in a state in which the electronic apparatus is in landscape mode according to an embodiment.
Figure 4B:
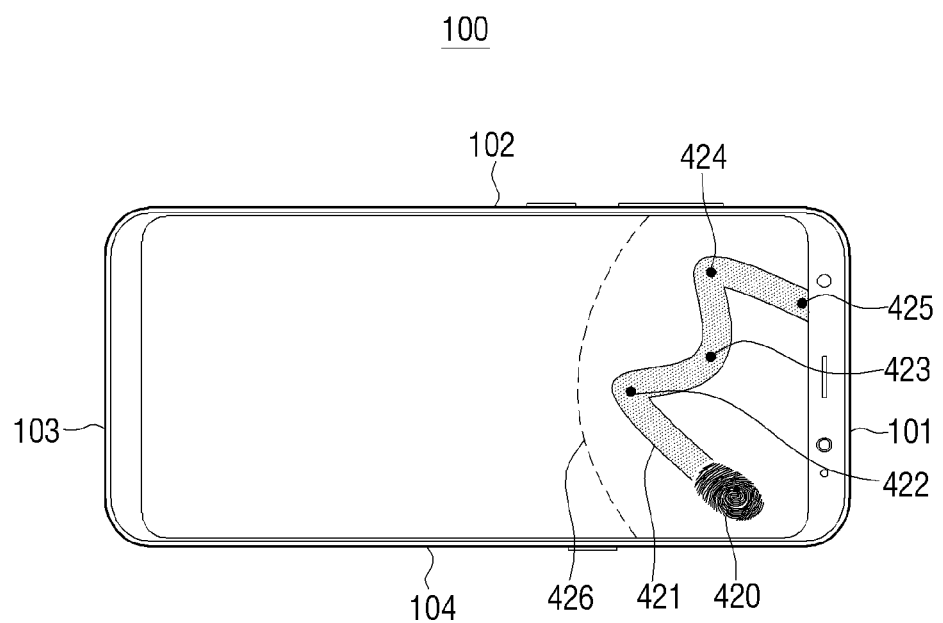
Figure 4C:
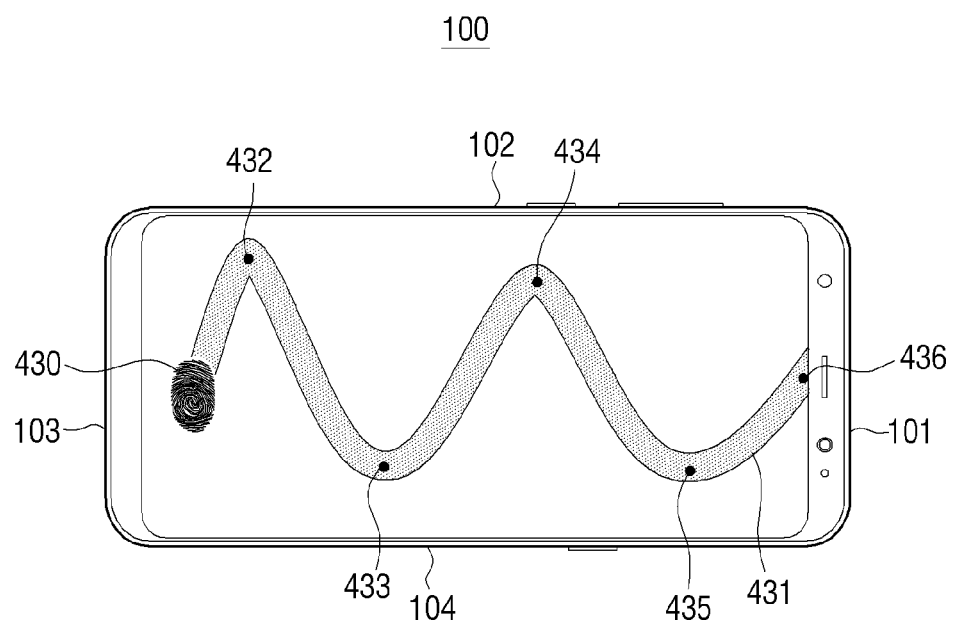

FIGS. 4A to 4C are diagrams illustrating an electronic apparatus for displaying a path based on a shape in which a user holds a display in a state in which the electronic apparatus is in landscape mode according to an embodiment.

The processor 130 may identify whether the user holds the electronic apparatus 100 horizontally or vertically by using a gyro sensor. A technique for identifying whether the user horizontally holds the electronic apparatus using the gyro sensor is obvious to those skilled in the art, and thus a detailed description thereof will be omitted. In addition, descriptions of portions overlapping with FIGS. 3A, 3B and 3C among the descriptions in FIGS. 4A, 4B and 4C will be omitted for convenience.

When the user holds the electronic apparatus 100 horizontally, the reference boundary among the plurality of boundaries 101, 102, 103, and 104 included in the electronic apparatus 100 may be the boundaries 101 and 103.

As shown in FIGS. 4A and 4B, when an acute angle between the fingerprint of the user and the boundaries 101 and 103 is greater than or equal to a predetermined range, the processor 130 may identify that the user performed the touch with a hand holding the electronic apparatus.

In this case, the processor 130 may generate a path in a predetermined range in the region where the fingerprint of the user is detected, and display the generated path.

For example, referring to FIG. 4A, the processor 130 may identify that the angle between the fingerprint of the user and the reference boundary 103 is greater than or equal to a predetermined value, and the fingerprint of the user is directed toward the upper right of the display 120, and identify, based on the acquired result, the user has performed touch with the left hand while holding the apparatus with the left hand.

Based on the identified result, the processor 130 may generate a path in a predetermined range in a region where the fingerprint of the user is detected. The processor 130 may generate a path in a left region 416 of the display and display the generated path based on a result of identifying that the user performs touch while holding the electronic apparatus 100 with the left hand. In this case, the processor 130 may include a region 410 in which the fingerprint of the user is detected, at least one point 412, 413, 414 present in the left region 416, and an endpoint 415 present in the boundary 103, and generate a path existing in the left region 416 of the display 120.

Referring to FIG. 4B, the processor 130 may identify that the angle between the fingerprint of the user and the reference boundary 101 is greater than or equal to a predetermined value, and the fingerprint of the user is directed toward the upper left of the display 120, and identify, based on the acquired result, the user has performed touch with the right hand while holding the apparatus with the right hand.

Based on the identified result, the processor 130 may generate a path in a predetermined range in a region where the fingerprint of the user is detected. The processor 130 may generate a path in a right region 426 of the display and display the generated path based on a result of identifying that the user performs touch while holding the electronic apparatus 100 with the right hand. In this case, the processor 130 may include a region 420 in which the fingerprint of the user is detected, at least one point 422, 423, and 424 present in the right region 426, and an endpoint 425 present in the boundary 101, and generate a path existing in the right region 426 of the display 120.

Referring to FIG. 4C, the processor 130 may display a path on the entire region of the display 120. When it is identified that the fingerprint of the user is parallel to the reference boundaries 101 and 103 or the angle between the fingerprint of the user and the reference boundary 103 is less than a predetermined value, the processor may identify that the user performed touch with a hand other than the hand holding the display device.

In this case, the processor 130 may generate a path in the entire region of the display 120 based on the identified result. The processor 130 may control the display to select at least one point 432, 433, 434 and 435 in the entire region of the display, select an endpoint 436 positioned at the boundary of the display, and generate a path including the selected at least one point 432, 433, 434 and 435 and the endpoint 436 and display it on the display 120.

In FIGS. 3A, 3B, 3C, 4A, 4B, and 4C, the path displayed on the display 120 is illustrated as a path having a plurality of inflection points, but the disclosure is not limited thereto. In other words, the path may be a straight path from the region where the fingerprint has been detected to the boundary of the display.

The number of inflection points and a length of the path displayed on the display 120 may be determined according to a security strength.

Figure 5A:
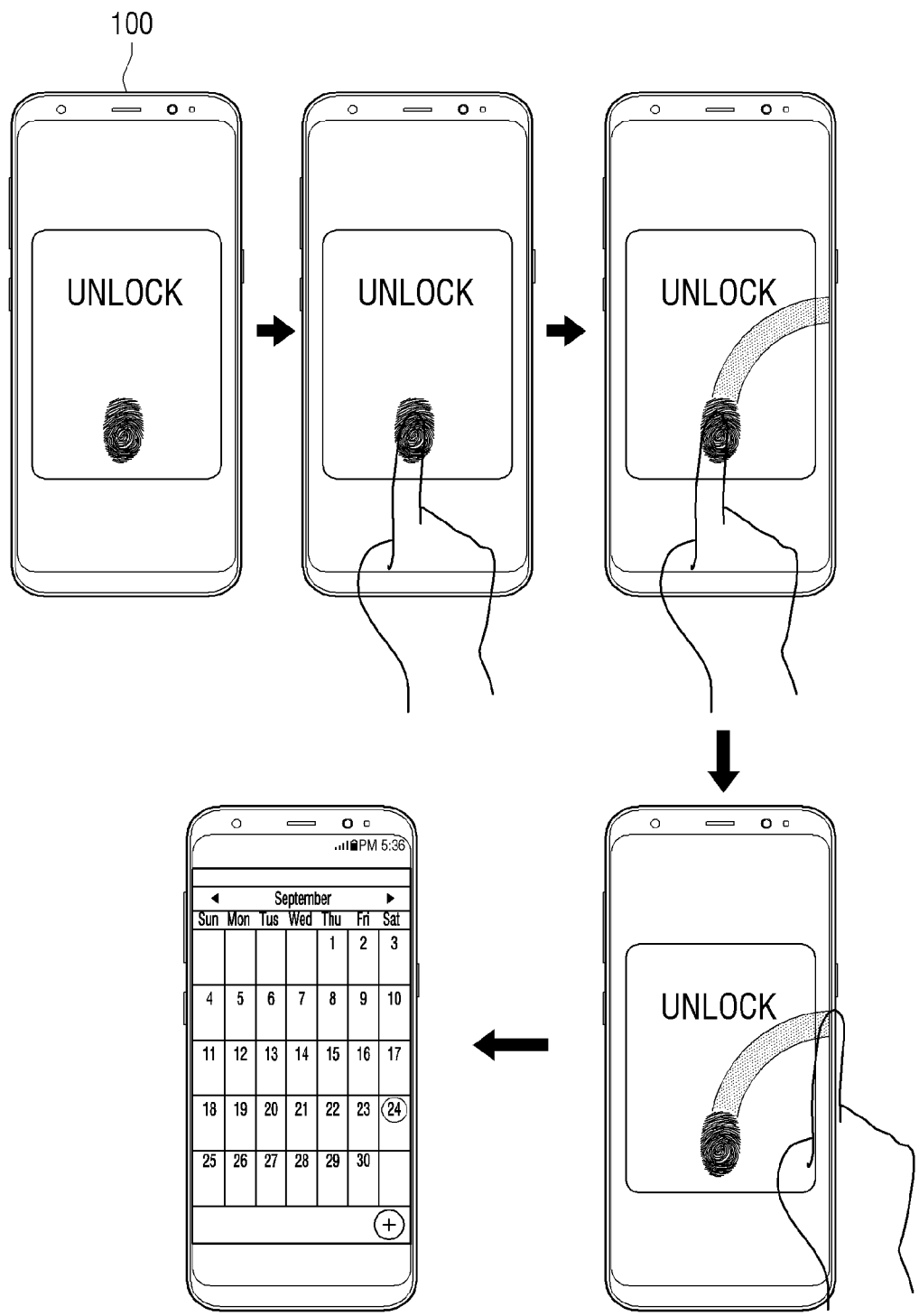
FIGS. 5A and 5B are diagrams illustrating a path displayed on a display according to a security strength of an application according to an embodiment.
Figure 5B:
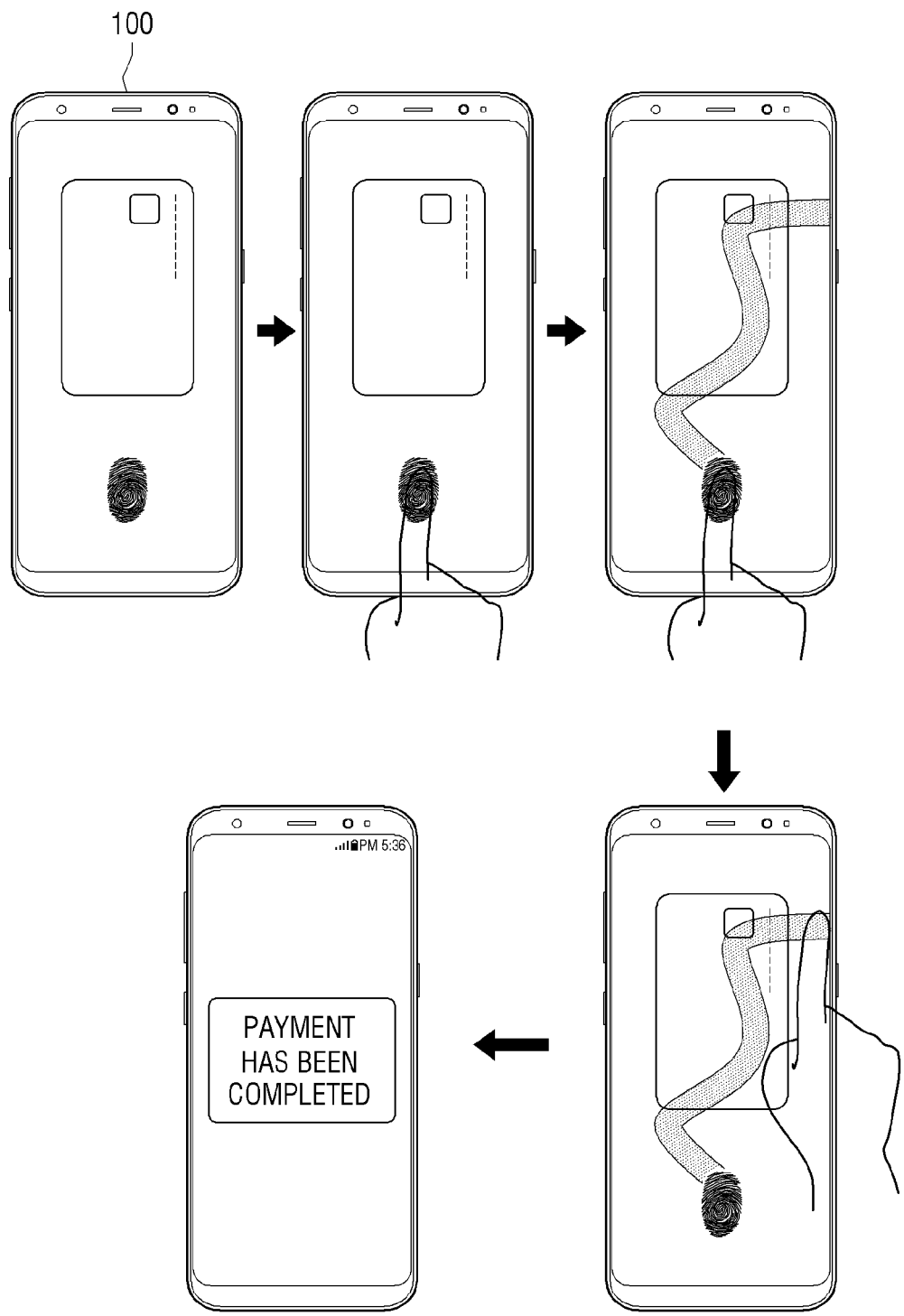

FIGS. 5A and 5B are diagrams illustrating a path displayed on a display according to a security strength of an application according to an embodiment.

When user authentication is required to execute the application and perform a specific function of the application, the processor 130 may identify a security strength of the application. When user authentication is required to perform a specific function of the application, the processor 130 may receive a user authentication request from the application. The processor 130 may identify the security strength of the application based on information about the application stored in the memory or receive information related to the security strength of the application from an external device.

In this case, the number of inflection points or a path length included in the path may be determined, depending on the identified security strength, and a path may be generated based on the determined number of inflection points or path length.

For example, as shown in FIG. 5A, when a user authentication request is received from an application with low security strength (e.g., a calendar application, a memo application), the processor 130 may generate a path including less than a predetermined number of inflection points or less than a predetermined path length, and display it on the display 120. The number of inflection points or the length of the path may be predetermined by the user or may be predetermined by a system.

As shown in FIG. 5B, when a user authentication request is received from an application with high security strength (e.g., a bank application, a card application), the processor 130 may generate a path including equal to or greater than a predetermined number of inflection points or equal to or greater a predetermined path length, and display it on the display 120.

Although it has been described that the security strength is determined according to the application in FIGS. 5A and 5B, the disclosure is not limited thereto. For example, even in one application, the security strength may be variously set according to a function of the application, and a path may be displayed based on the security strength set corresponding to the function.

In addition, various paths may be displayed according to the set security strength in the execution of the electronic apparatus as well as the execution of the application. For example, in the case of unlocking the electronic apparatus, a path may be displayed according to the security strength set by the user. For example, when a user A grants high security strength to unlocking the electronic apparatus, user A's electronic apparatus may include a predetermined number of inflection points or more or generate a path length greater than or equal to a predetermined length when unlocking the electronic apparatus. When a user B grants low security strength to unlocking the electronic apparatus, user A's electronic apparatus may include inflection points less than the predetermined number or generate a path less than the predetermined length when unlocking the electronic apparatus.

Figure 6:
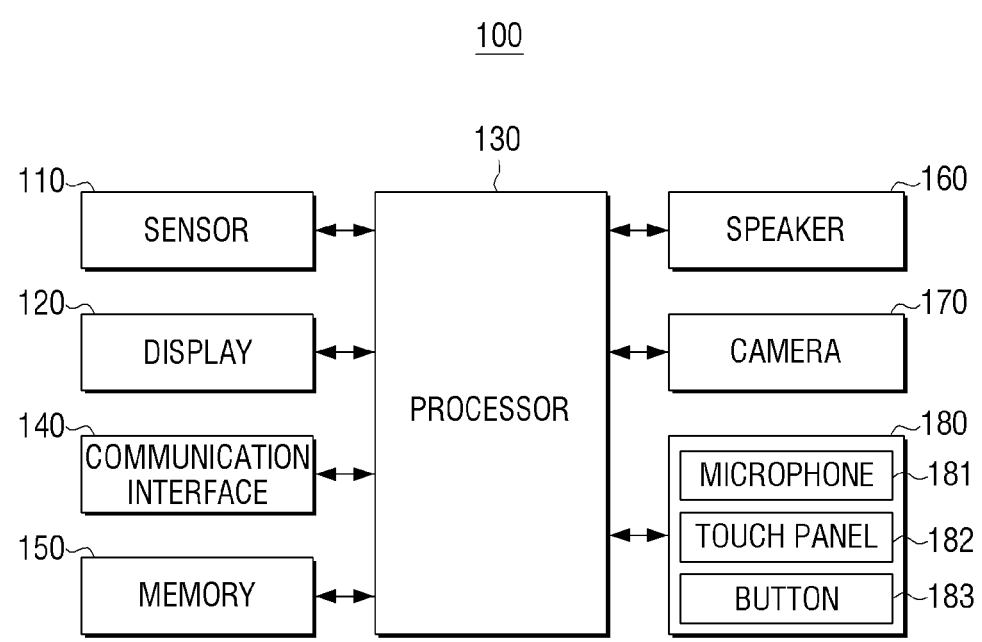
FIG. 6 is a diagram illustrating detailed elements of an electronic apparatus according to an embodiment.

FIG. 6 is a diagram illustrating detailed elements of an electronic apparatus according to an embodiment.

Referring to FIG. 6, the electronic apparatus 100 includes a sensor 110, a display 120, a processor 130, a communication interface 140, a memory 150, a speaker 160, a camera 170, and an input interface 180. Descriptions overlapping with those described above in FIG. 2 will be omitted.

The communication interface 140 may include various communication modules such as a wired communication module, a short-range wireless communication module, a wireless communication module, or the like.

The wired communication module is a module for performing communication with an external device according to a wired communication method such as wired Ethernet. In addition, the short-range wireless communication module is a module for performing communication with an external device positioned in a short distance according to a short-range wireless communication method such as Bluetooth (BT), Bluetooth Low Energy (BLE), ZigBee method, or the like. In addition, the wireless communication module is a module that is connected to an external network according to a wireless communication protocol such as Wi-Fi and IEEE to communicate with an external device and a voice recognition server. In addition to the above, the wireless communication module may further include a mobile communication module which accesses a mobile communication network according to a variety of mobile communication standards such as 3rd generation (3G), 3rd Generation Partnership Project (3GPP), Long Term Evolution (LTE), LTE Advanced (LTE-A) and 5th generation (5G), or the like.

The memory 150 is an element for storing various programs and data necessary for the operation of the electronic apparatus 100. The memory 150 may be implemented as a non-volatile memory, a volatile memory, a flash memory, a hard disk drive (HDD) or a solid state drive (SDD). The memory 150 may be accessed by the processor 130, and perform readout, recording, correction, deletion, update, and the like, on data by the processor 130. In the disclosure, the term "memory" may include the memory 150, a read-only memory (ROM) in the processor 130, a random access memory (RAM), or a memory card mounted in the electronic apparatus 100 (e.g., micro secure digital (SD) card, memory stick).

Fingerprint information of the user may be pre-stored in the memory 150 for user authentication. In this case, the fingerprint of the user information may include information on characteristic patterns of valleys and ridges in the fingerprint of the user. In addition, the fingerprint of the user information is fingerprint information on at least one of the user's ten fingers, and may include fingerprint information on the plurality of fingers. Also, fingerprint information of a plurality of users may be stored in the memory 150 in some cases.

The speaker 160 is configured to output not only various audio data on which various processing tasks such as decoding, amplification, and noise filtering have been performed by an audio processor but also various notification sounds or voice messages. Particularly, the speaker 160 may output a response to the user's voice information as a voice message in a form of a natural language. A configuration for outputting audio may be implemented as a speaker, but this is only an exemplary embodiment and may be implemented as an output terminal capable of outputting audio data.

The camera 170 is configured to capture an image. The camera 170 may be installed in a direction opposite to a direction in which the display 120 provides a screen to the user. For example, when the display 120 is installed on a front side of the electronic apparatus 100, the camera 170 may be installed on a back side of the electronic apparatus 100. However, this is only an example, and the camera 170 may be additionally installed on at least one of the front, rear, left, and right surfaces to capture attitude or motion of the user.

The input interface 180 may receive a user input for controlling the electronic apparatus 100. Particularly, the input interface 180 may receive a user's voice information on content to be reproduced or a user input for selecting a GUI displayed on the display. As shown in FIG. 6, the input interface 180 may include a microphone 181 for receiving a user's voice, a touch panel 182 for receiving user touch using a user's hand or a stylus pen, and a button 183 for receiving a user manipulation. However, the example of the input interface 180 illustrated in FIG. 6 is only an exemplary embodiment, and may be implemented with other input devices (e.g., a keyboard, a mouse, a motion input unit, etc.).

Computer instructions for performing a processing operation in the electronic apparatus 10 according to certain embodiments of the disclosure described above may be stored in a non-transitory computer-readable medium. When the computer instructions stored in the non-transitory computer-readable medium are executed by a processor of a specific device, the specific device described above performs the processing operation in the electronic apparatus 100 according to certain embodiments described above.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a ROM, and the like, and may be provided.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic apparatus comprising:
a display;
a sensor configured to detect a fingerprint of a user on the display;
a processor configured to:
identify the fingerprint of the user based on information from the sensor,
determine a first region where the fingerprint has been detected and an endpoint positioned at a boundary of the display;
generate a path that leads to the endpoint in the first region, the path configured to guide a user touch on the display to move to the endpoint from the first region; and
control the display to display the path.

2. The electronic apparatus of claim 1, wherein the processor is further configured to complete a user authentication based on the identified fingerprint of the user being a pre-registered fingerprint and a movement of the user touch being completed along the path.

3. The electronic apparatus of claim 2, wherein the processor is further configured to:
control the display to display a lock screen, and
control the sensor to detect the fingerprint based on the user touch being detected on the lock screen.

4. The electronic apparatus of claim 2, wherein the processor is further configured to, based on the user authentication being required:

control the display to display a user interface (UI) element configured to request a touch of a finger on the display, and control the display to display the path based on the touch of the finger being detected after the UI element is displayed.

5. The electronic apparatus of claim 4, wherein the processor is further configured to:

identify a security strength of an application requesting the user authentication, determine a number of inflection points included in the path or a length of the path corresponding to the security strength, and generate the path based on the number of the inflection points or the length of the path.

6. The electronic apparatus of claim 1, wherein the processor is further configured to:

determine a holding shape of the user based on the identified fingerprint of the user, determine a second region where the path is to be displayed based on the holding shape of the user, and generate the path in the second region.

7. The electronic apparatus of claim 6, wherein the processor is further configured to generate the path in a partial region of the display based on the holding shape of the user.

8. The electronic apparatus of claim 1, wherein the path is a straight path from the first region where the fingerprint has been detected to the boundary of the display.

9. The electronic apparatus of claim 1, wherein the processor is further configured to:

determine a plurality of points on the display, and generate the path that passes through the plurality of points and leads to the endpoint in the first region where the fingerprint has been detected.

10. A method for controlling an electronic apparatus, the method comprising:

detecting a fingerprint of a user on a display;

determining a first region where the fingerprint has been detected and an endpoint positioned at a boundary of the display;

generating a path that leads to the endpoint in the first region where the fingerprint has been detected, the path configured to guide a user touch on the display to move to the boundary of the display from the first region;

identifying the fingerprint of the user based on the first region; and displaying the path.

11. The method of claim 10, further comprising:

authenticating the user based on the identified fingerprint of the user being a pre-registered fingerprint and a movement of the user touch being completed along the path.

12. The method of claim 11, further comprising displaying a lock screen, wherein the detecting the fingerprint of the user comprises detecting the fingerprint based on the user touch being detected on the lock screen.

13. The method of claim 11, further comprising:

based on a user authentication being required, displaying a user interface (UI) element configured to request a touch of a finger on the display; and displaying the path based on the touch of the finger being detected after the UI element is displayed.

14. The method of claim 13, further comprising:

identifying a security strength of an application requesting user authentication;

determining a number of inflection points included in the path or a length of the path corresponding to the security strength; and generating the path based on the number of the inflection points or the length of the path.

15. The method of claim 10, further comprising:

determining a holding shape of the user based on the identified fingerprint of the user;

determining a second region where the path is to be displayed based on the holding shape of the user; and generating the path in the second region.

* * * * *